United States Patent

Fairbanks

[15] 3,649,142

[45] Mar. 14, 1972

[54] APPARATUS FOR EXTRUDING NET-LIKE STRUCTURES

[72] Inventor: Theodore H. Fairbanks, Liverpool, Pa.

[73] Assignee: FMC Corporation, Philadelphia, Pa.

[22] Filed: Oct. 29, 1969

[21] Appl. No.: 872,006

[52] U.S. Cl. ............................. 425/109, 264/103, 264/167, 264/DIG. 81, 425/192, 425/168, 425/382
[51] Int. Cl. .......................................................... B29f 3/00
[58] Field of Search ............ 18/8 SR, 12 DR, 12 N; 264/103, 264/167, DIG. 81

[56] References Cited

UNITED STATES PATENTS 3,418,685  12/1968  Anderson et al. ..................... 18/12 N

FOREIGN PATENTS OR APPLICATIONS 723,069  12/1965  Canada ................................. 18/12 N
892,901  4/1962  Great Britain .................. 264/DIG. 81

*Primary Examiner*—J. Spencer Overholser
*Assistant Examiner*—Lucius R. Frye
*Attorney*—Thomas R. O'Malley, George F. Mueller and Eugene G. Horsky

[57] ABSTRACT

Apparatus for making tubular net-like structures which includes a pair of cup-shaped extrusion members mounted in nested but spaced-apart relationship on a fixed support, which extends axially therethrough and through which flowable strand-forming material is delivered into the extrusion members, and means for relatively rotating the extrusion members.

5 Claims, 5 Drawing Figures

Patented March 14, 1972 3,649,142
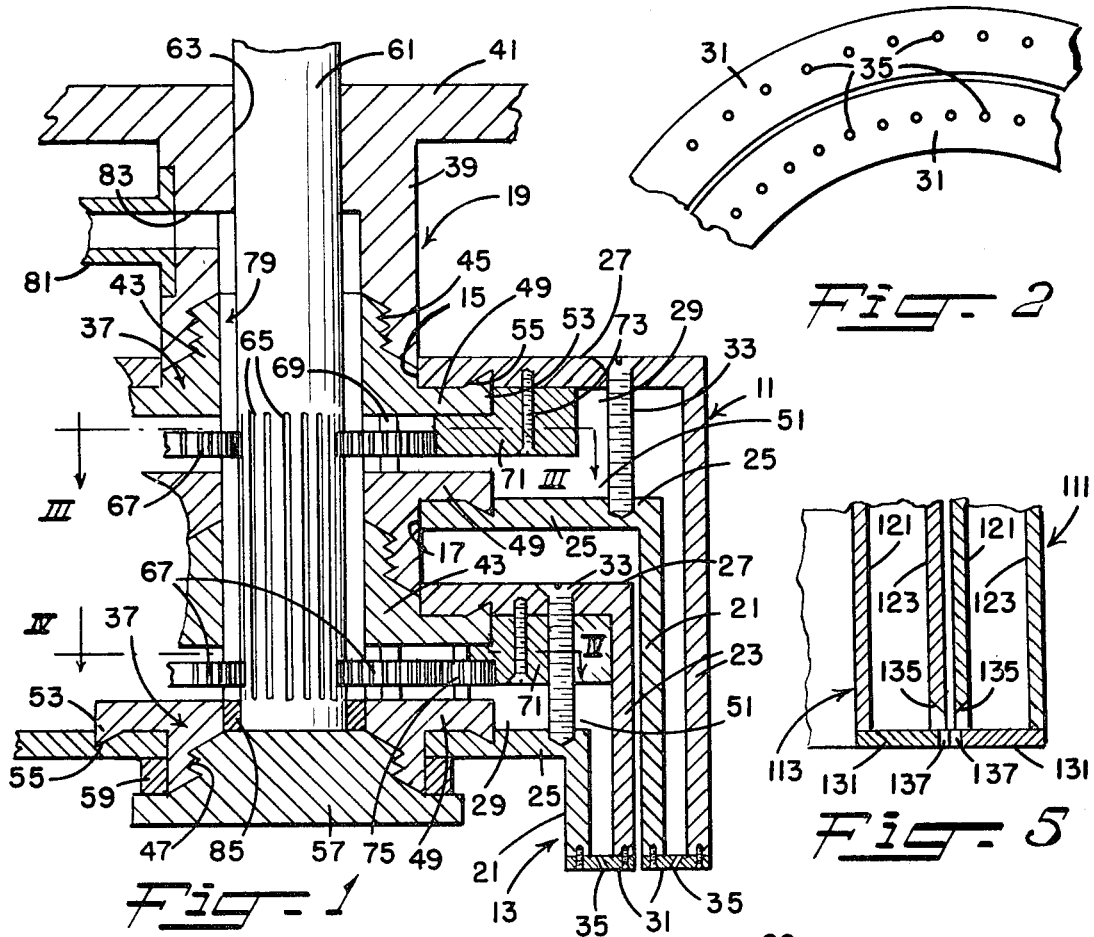
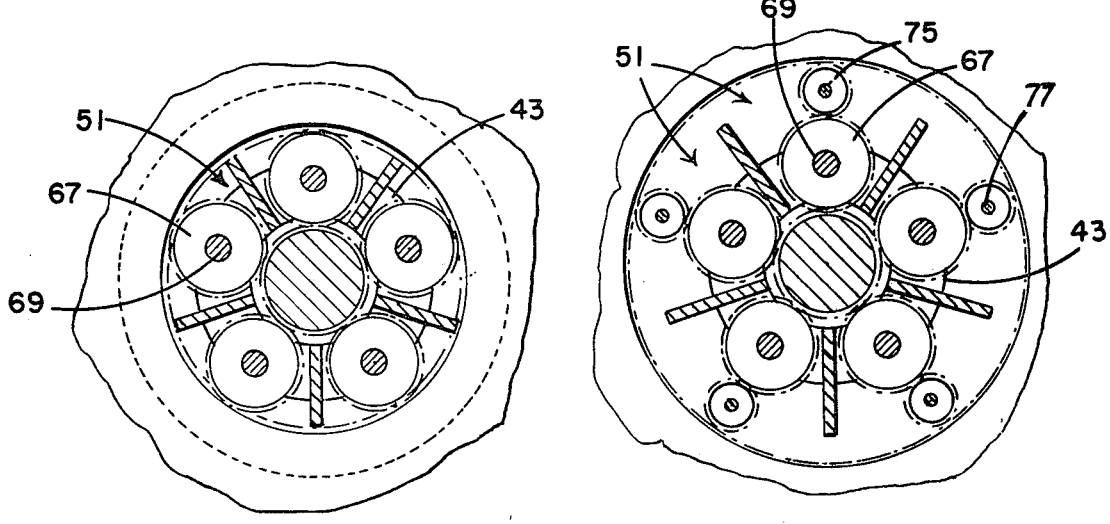

APPARATUS FOR EXTRUDING NET-LIKE STRUCTURES

The present invention relates to improved apparatus for making tubular netlike structures.

U.S. Pat. No. 2,919,467, relates to the manufacture of netlike structures wherein plastic material is extruded through a series of orifices, formed along each of two contacting surfaces or slideways of a pair of straight or annular die-carrying members, as relative movement is imparted to such members in a direction transversely to the direction of extrusion. The plastic material is extruded as mesh intersection-forming streams when the series of die orifices in the two die-carrying members are in registration with each other. As the two series of die orifices are moved out of registration, the mesh intersection-forming streams are divided to provide separate strand-forming streams.

With the apparatus disclosed in the above-noted patent, leakage of plastic material along the contacting surfaces or slideways of the die-carrying members must be avoided. When employing annular die-carrying members such leakage is particularly difficult to avoid or control in view of the continuous wearing of their contacting surfaces as these are moved relative to each other. Accordingly, a primary object of the present invention is to provide an improved apparatus for making tubular netlike structures.

Another object of this invention is the provision of an improved extrusion apparatus, for use in making tubular netlike structures, which is substantially free of undesired leakage of flowable strand-forming material between movable parts thereof.

Still another object is to provide an improved extrusion apparatus for making tubular netlike structures in which a pair of independent, relatively rotatable extrusion members are adapted to be continuously supplied with flowable strand-forming materials under pressure from a common source.

A further object is the provision of an improved extrusion apparatus for making continuous tubular netlike structures which is simple in construction and use, is capable of making netlike structures of different diameters and is adapted to be adjusted to accommodate for wear along surfaces of movable parts thereof.

These and other objects are accomplished in accordance with the present invention by an improved apparatus which includes a pair of cup-shaped extrusion members, each of which has an axial opening and includes, at one end thereof, a pair of spaced annular walls which together define a continuous annular passage, and a series of orifices at the opposite end thereof. Means are provided for communicating the passage in the respective members with the orifices therein.

The extrusion members are positioned in nested but spaced apart relationship, and a fixed housing, having a chamber therein, extends through the axial openings in such members. On the exterior of this housing are means defining bearing surfaces which engage with the spaced annular walls of the respective extrusion members and support the same for rotary movement.

Means are provided for delivering flowable strand-forming material under pressure into the housing chamber. Openings in the housing, extending from the chamber therein and in alignment with the passages in the respective extrusion members, permit continuous delivery of flowable strand-forming material from the housing chamber and into the extrusion members themselves.

At least one of the extrusion members is rotated relative to the housing and, if desired, both of such members may be rotated in the same or opposite directions. Preferably, the rotating means includes a shaft extending axially of the housing and the chamber therein, means for rotating such shaft, gear teeth on the shaft periphery in alignment with the openings in the housing, a separate ring gear fixed within the passage of each of such extrusion members, and idler gears mounted within the openings in the housing and meshing with the gear teeth on the shaft and the ring gear which is aligned therewith. If the extrusion members are to be rotated in the same direction the idler gears aligned with the respective ring gears need differ only in size so that such members will be driven at different rates of speed. On the other hand, if the extrusion members are to be rotated in opposite directions the idler gears mounted within the openings aligned with the respective ring gears will differ in number.

For the sake of easy assembly of the apparatus, the housing is formed of a pair of axially aligned, separable segments each having a pair of spaced annular flanges projecting from the periphery thereof and providing the bearing surfaces upon which the extrusion members are carried. The openings, which provide communication between the housing chamber and the passages in the extrusion members, extend through the respective segments and open between the flanges thereof.

The extrusion members are preferably of hollow construction and include a pair of spaced, parallel side walls, which have their adjacent ends connected to one of the pairs of spaced annular walls, and a plate extending between the other adjacent ends of the side walls. Such plate includes the extrusion orifices and the plates of both extrusion members are preferably disposed in a common plane. The axes of the extrusion orifices of at least one of the nested extrusion members are inclined relative to the axes of the orifices in the other of such members so that streams of flowable strand-forming material which issue from such different orifices are directed along converging paths. The extrusion members may be of cylindrical or conical configuration.

In the operation of the above-described apparatus, flowable strand-forming material is continuously delivered under pressure into the housing chamber, flows through the housing openings and into the passages of the respective extrusion members. The extrusion members are rotated in the same or opposite directions in a manner as heretofore described and the flowable strand-forming material continuously issues from the orifices therein. The streams of strand-forming material issuing from the two extrusion members will contact and bond together at the locations at which they cross and are thereafter set. The inclination of the orifices in the two extrusion members will assure that the streams of stand-forming material issuing from such members contact each other at their locations of crossing.

If desired, the orifices in the two extrusion members may be disposed in parallel relationship. In this instance, desired contact between streams may be effected or encouraged by mandrels and/or rings which urge the streams extruded from one such member toward the streams issuing from the other of such members.

In lieu of providing the end plates of the respective extrusion members with orifices, the outer side wall of the inner extrusion member and the adjacent inner wall of the outer extrusion member may be formed with spaced orifices located adjacent to their respective end plates. Additionally, such end plates would each be provided with slots which extend across the periphery thereof and are aligned with the orifices in the side walls of the extrusion members of which they are a part so as to provide an unobstructed path from each of such orifices.

Upon relatively rotating the two extrusion members, as in the apparatus heretofore described, streams of flowable strand-forming material would issue continuously from the orifices in such members. At the locations at which the individual orifices in one of the extrusion members become aligned with the individual orifices in the other of such members, the streams issuing therefrom contact with each other. This contact between the streams of strand-forming material will occur as they leave the extrusion members. Thus, this particular embodiment of the apparatus is especially well adapted for use when rapid contact between the extruded streams is desired or necessary to insure a good bond therebetween at their points of crossing.

The apparatus of the present invention is adapted for use with a variety of materials, which are referred to as "flowable strand-forming," including materials which are thermoplastic, such as polyamides or superpolyamides, polyesters, polyvinyl chloride, copolymers thereof, polyolefins, cellulose acetates, etc., natural or synthetic rubbers, thermosetting materials or wet-spinnable materials, such as viscose, cupro-ammonium cellulose, or carboxymethyl cellulose. Such materials may include various additives such as stabilizers, dyes, foaming agents, etc., if so desired. It will be apparent that the manner by which the extruded streams are set will depend upon the particular material which is being employed.

FIG. 1 is a vertical section through the apparatus of the present invention with a portion thereof being broken away;

FIG. 2 is a bottom view of a portion of the apparatus shown in FIG. 1;

FIG. 3 is a horizontal section taken along the line III—III of FIG. 1;

FIG. 4 is a horizontal section taken along the line IV—IV of FIG. 1; and

FIG. 5 is a fragmentary vertical section of a portion of a modified apparatus of the present invention.

With reference to FIG. 1 of the drawing, the apparatus of the present invention includes a pair of cup-shaped extrusion members 11 and 13 having axial openings 15 and 17, respectively, through which extends a fixed housing 19. The extrusion members 11 and 13 may be of conical configuration or, as illustrated, each may include a pair of radially spaced, cylindrical side walls 21 and 23, a pair of spaced annular walls 25 and 27 at one end thereof, which define a continuous annular passage 29, and a plate 31 at the opposite end thereof which extends between the adjacent ends of such side walls. Screws 33 connect the walls 25 and 27 of the respective extrusion members and do permit some degree of adjustment of such walls as hereafter described.

The plates 31 of the two extrusion members 11 and 13 are preferably disposed along a common plane and each include a series of spaced orifices 35. The axes of the orifices 35 of the two extrusion members 11 and 13 are preferably inclined as illustrated so that the streams of strand-forming material which are extruded therefrom are directed along converging paths.

The housing 19 includes a pair of like, separable segments 37 which are connected to a sleeve 39 of a fixed supporting frame 41. In appearance the segments 37 each resemble a pulley having a hub 43, which is externally threaded at one end at 45 and internally threaded at its opposite end at 47, and a pair of flanges 49. Each hub 43 has an internal diameter which corresponds with that of the sleeve 39 and, as shown in FIGS. 3 and 4, is formed with a series of radial openings 51 in the areas between the flanges 49. Circular ribs 53 project from the outer surfaces of the flanges 49 of each of the segments 37 and are adapted to seat snugly, yet slidably, within mating recesses 55 formed along the opposing surfaces of the annular walls 25 and 27 of the respective extrusion members.

The extrusion members 11 and 13 may be connected onto the respective housing segments 37 after such segments have been threaded into each other and into the sleeve 39, or alternatively and preferably, the extrusion members may be attached to the respective segments 37 after which the segments are threaded together and attached to the sleeve 39. A plug 57 is threaded into the lowermost of the housing segments 37 to close off the lowermost end of the housing and, together with a spacer 59, assists in maintaining the innermost of the nested extrusion members in desired position.

Rotary movement is imparted to the extrusion members by a drive shaft 61 which is turned by suitable means, not shown, and extends through an opening 63 in a frame 41, the sleeve 39 and the housing 19 and terminates adjacent to the plug 57. The shaft 61 has an outside diameter which is substantially less than the inside diameters of the sleeve 39 and the housing segments 37, for reasons as hereafter described, and is provided along its periphery with longitudinally extending gear teeth 65.

A gear 67, rotatably carried by a shaft 69, is positioned within at least one of the radial openings 51 of each of the housing segments 37 and meshes with the teeth 65 on the drive shaft 61. Rotation of the gears 67 is transmitted to ring gears 71, which are attached within the respective extrusion members by screws 73. In the case of the extrusion member 11 the gear 67 meshes directly with the ring 71 which is aligned therewith. The ring gear 71 which is fixed to the extrusion members 13, on the other hand, is driven by the gear 67 with which it is aligned through an idler gear 75. With this arrangement the members 11 and 13 are both rotated relative to the fixed housing 19 and in opposite directions relative to each other. As shown in FIGS. 1 and 4, the idler gears 75 are rotatably carried by shafts 77 which are disposed within the radial openings 51 of the housing segments 37 and extend between the flanges thereof.

As heretofore mentioned, the periphery of the drive shaft 61 is spaced from the inside walls of the sleeve 39 and the housing segments 37 to thus provide an annular chamber 79. From a suitable source, not shown, flowable strand-forming material is continuously delivered under pressure into the chamber 79 through a conduit 81 which passes through an opening 83 in the sleeve 39. Flowing through the radial openings 51 in the housing segments 37, the strand-forming material enters into and fills the respective extrusion members 11 and 13 and issues from the orifices 35 thereof as continuous streams. A seal 85 may be provided along the lower end of the chamber 79 to avoid flowable strand-forming material from collecting at such area.

As the extrusion members 11 and 13 are rotated in opposite directions relative to each other, flowable strand-forming material issues from the extrusion orifices 35 as separate streams, with the streams from one such member contacting with the streams extruded from the other of such members at the locations at which such streams cross. Setting of the extruded streams of flowable strand-forming material may be achieved by any convenient means, as by air in the case of molten strand-forming material, and is effected only after the streams have made their desired contact.

Conventional takeup means, not shown, are employed for collecting the finished netlike structures and serves to advance all of the extruded streams away from their respective orifices. If desired, a ring and/or mandrel may be positioned to engage with at least some of the extruded streams after their surfaces have been set to encourage or provide for the desired contact between the streams.

The rotation of the extrusion members 11 and 13 relative to the housing segments 37 may result in some slight wear along the surfaces of the annular walls 25 and 27 and/or the flanges of the housing segments 37. To compensate for such wear, the screws 33 may be tightened to insure that a tight seal remains between the annular walls of the respective extrusion members 11 and 13 and the bearing surfaces provided by the flanges 49 of the housing segments 37.

While the above-described apparatus has been shown on the drawing in position for extruding streams of strand-forming material in a vertically downward direction its position can, of course, be varied without impairing its operation. Further, the axes of the orifices of both of the extrusion members 11 and 13 may be disposed in parallel relationship. In this instance, it is most desirable to employ a ring and/or mandrel for encouraging contact of the streams extruded from one of the extrusion members with the streams issuing from the other of such members at their locations of crossing.

The modified form of apparatus shown in part in FIG. 5 includes a pair of concentric extrusion members 111 and 113, corresponding to the members 11 and 13 heretofore described, each having a pair of side walls 121 and 123 and an end plate 131. In this embodiment, however, extrusion orifices 135 are formed at spaced intervals along the side wall 121 of the extrusion member 111 and the side wall 123 of the extrusion 113. Aligned with such orifices 135 and extending across the peripheries of the respective end plates 131 are slots 137 which provide unobstructed passages from the respective extrusion orifices.

The extrusion members 111 and 113 of the apparatus shown in FIG. 5 are supplied with flowable strand-forming material and are relatively rotated in the same manner as the extrusion members 11 and 13 of the apparatus shown in FIGS. 1–4. In the operation of this modified apparatus, streams of flowable strand-forming material will issue continuously from the orifices 135 and will pass through the slots 137 in the end plates 131. At locations at which orifices 135 in the two extrusion members 111 and 113 are in alignment with each other the streams of strand-forming material issuing therefrom will, of course, contact and bond to each other as crossing streams.

With the apparatus shown in FIG. 5, the shaped streams of strand-forming material make contact with each other at their locations of crossing immediately as they issue from the respective extrusion members and thus insure that a strong bond exists between the streams at such locations of crossing. This particular apparatus is especially suited for use under conditions where rapid setting of the extruded streams of flowable strand-forming material is effected, as for example, where at least the free ends of the extrusion members are submerged within a setting or coagulating liquid.

I claim:

1. Apparatus for making tubular netlike structures including a pair of cup-shaped extrusion members positioned in nested but spaced apart relationship, each of said extrusion members having an axial opening and including at one end thereof a pair of spaced annular walls together defining a continuous annular passage extending from the opening therein, a series of spaced extrusion orifices at the opposite end thereof and means communicating said passage with said orifices, a fixed housing extending through the axial openings in said extrusion members and having a chamber therein, means on the exterior of said housing defining bearing surfaces which engage with the spaced annular walls of the respective extrusion members and slidably support the same, means for delivering flowable strand-forming material into the chamber of said housing, openings in the housing extending from said chamber in alignment with the passages in the respective extrusion members for delivering flowable strand-forming material thereto, and means for rotating at least one of said extrusion members relative to said housing.

2. Apparatus as defined in claim 1 where in said rotating means includes a shaft extending axially of said housing and the chamber therein, means for turning said shaft, gear teeth on the periphery of said shaft in alignment with the openings in said housing, a ring gear fixed within the passage of each of said extrusion members, and idler gears mounted within the openings in said housing and meshing with the gear teeth on said shaft and the ring gear aligned therewith.

3. Apparatus as defined in claim 2 wherein the idler gears mounted within the openings aligned with the respective ring gears differ in number to provide for rotation of said extrusion members in opposite directions.

4. Apparatus as defined in claim 1 wherein said housing includes a pair of separable axially aligned segments, each of said segments having a pair of spaced annular flanges projecting from the periphery thereof and providing said bearing surfaces, and wherein the openings and said housing extend from the housing chamber and between the respective pairs of flanges.

5. Apparatus as defined in claim 1 wherein said extrusion members are each of hollow construction and include a pair of spaced, parallel side walls which are connected at one end thereof to a pair of said spaced annular walls and a plate extending between said side walls at the opposite end thereof and including said orifices.

* * * * *

PO-1050
(5/69)

UNITED STATES PATENT OFFICE
CERTIFICATE OF CORRECTION

Patent No. 3,649,142  Dated 3/14/72

Inventor(s) Theodore H. Fairbanks

It is certified that error appears in the above-identified patent and that said Letters Patent are hereby corrected as shown below:

Col. 4, line 3, after "ring" insert -- gears --; line 70, after "sion" insert -- member --.

Signed and sealed this 15th day of August 1972.

SEAL)
ttest:

DWARD M. FLETCHER, JR.
ttesting Officer

ROBERT GOTTSCHALK
Commissioner of Patents